United States Patent
Bernard et al.

(10) Patent No.: US 7,526,274 B2
(45) Date of Patent: Apr. 28, 2009

(54) AUTHENTICATION METHOD IN DATA COMMUNICATION AND SMART CARD

(75) Inventors: Eddy Bernard, Montrouge (FR); Stéphanie Salgado, Montrouge (FR)

(73) Assignee: Axal to S.A, Meudon Cedex (FR)

( * ) Notice: Subject to any disclaimer, the term of this patent is extended or adjusted under 35 U.S.C. 154(b) by 363 days.

(21) Appl. No.: 10/571,216

(22) PCT Filed: Aug. 30, 2004

(86) PCT No.: PCT/IB2004/002815
§ 371 (c)(1), (2), (4) Date: Mar. 8, 2006

(87) PCT Pub. No.: WO2005/025178
PCT Pub. Date: Mar. 17, 2005

(65) Prior Publication Data
US 2007/0005986 A1    Jan. 4, 2007

(30) Foreign Application Priority Data
Sep. 9, 2003   (EP) .................................. 03292219

(51) Int. Cl.
H04M 1/66    (2006.01)
H04M 1/68    (2006.01)
H04M 3/16    (2006.01)

(52) U.S. Cl. ...................................................... 455/411
(58) Field of Classification Search ................... 455/411
See application file for complete search history.

(56) References Cited
FOREIGN PATENT DOCUMENTS

| | | | |
|---|---|---|---|
| EP | 0 654 919 A2 | 5/1995 |
| EP | 0 789 335 A2 | 8/1997 |
| EP | 0 654 919 A3 | 4/2000 |
| EP | 1 156 694 A1 | 11/2001 |
| WO | WO 99/64996 | 12/1999 |

OTHER PUBLICATIONS

International Search Report dated Nov. 12, 2004 (2 pages).

*Primary Examiner*—William D Cumming
(74) *Attorney, Agent, or Firm*—Osha • Liang LLP

(57) ABSTRACT

The invention sets forth an authentication method for use in a system including a first entity and a second entity in a network, the first entity being adapted to authenticate the second entity and data received therefrom, both first and second entities storing the same secret key. The method is implemented in a smart card such as a USIM card, including: a memory storing authentication algorithms and keys; means for receiving a message authenticating code and other parameters; means for computing an expected code from said other parameters and from said secret key; means for comparing said message authenticating code received and said expected code; and means for aborting authentication if the message authenticating code received and the expected code do not match. The smart card further comprises a failure counter adapted to store the number of abortion occurrences, and means for updating said failure counter every time the comparing means indicate that said message authenticating code and said expected code do not match. Thanks to its built-in failure counter and the fact that the updating of this counter is controlled from inside the card, the card becomes tamper-resistant against reiterated fraudulent authentication attempts.

4 Claims, 2 Drawing Sheets

AUTHENTICATION METHOD IN DATA COMMUNICATION AND SMART CARD

BACKGROUND OF THE INVENTION

1. Field of the Invention

This invention relates to authentication in data communication. In particular the invention relates to, but is not limited to, authenticating mobile stations and network servers communicating with each other through a network such as the Internet.

The example which will illustrate the invention is that of a mobile communication system comprising a mobile communication network and mobile stations. In this example, the network provides a service to a mobile station after authentication of the mobile station. The mobile station comprises a portable module such as a USIM card and comprises mobile equipment (handset) that is able to communicate with the network and that is able to communicate with the portable module.

2. Background Art

The present third generation (3G) standards (in particular TS 31.102 and TS 33.102) define the authentication protocol in a 3G network (known as AKA protocol, standing for Authentication Key Agreement) between the USIM card and an Authentication Center (AuC).

In this framework, the card is sent a so-called authentication request made up of several data fields:

a random challenge (RAND);

a sequence number (SQN) or a concealed sequence number (SQN⊕AK)

a message authentication code (MAC),

AK being an anonymity key, the symbol ⊕ being the bitwise Exclusive OR, MAC being a Message Authentication Code, SQN being a sequence number that may indicate from its value whether the ongoing request is a reiterated request or not.

Upon receipt of these data fields, the card computes SQN (if required), checks the MAC and checks from the SQN that the same request has not been already sent.

To compute the SQN (if required), the USIM:

computes the anonymity key AK with a function f5 (RAND, K)

eventually retrieves the sequence number SQN by way of (SQN⊕AK) ⊕ AK=SQN.

f5 is a key generating function used to compute AK.

K is a Long-term secret key shared between the card and the server.

Then, the card also generates an expected message authentication code XMAC using the RAND, K, SQN, an additional management field (AMF) and a authentication function f1.

Then the card compares the XMAC with the MAC which was included in the authentication request. If they are different, the card sends back to the hand-set a user authentication reject message with an indication of the cause and the card aborts the ongoing authentication procedure. In this case, the AuC may initiate a new identification and authentication procedure towards the client.

The card also verifies that the received sequence number SQN is in the correct range. The SQN may not differ more than by a predetermined amount of the SQN stored in the card. If the card considers the sequence number not to be in the correct range, it sends back to the AuC a synchronization failure message and aborts the ongoing procedure.

Such an authentication procedure is e.g. disclosed in EP-A-1 156 694. More details or explanations regarding the steps above may be found in the above-quoted standards for reference.

The MAC code (and therefore XMAC) is computed from the whole request data and the same authentication key as the requesting entity. Its role is to ensure that the request data has not been tampered during the transmission and also warrants the card that the requesting entity actually possesses the same authentication key as the card.

As the card is checking the integrity and authenticity of the data received from the server, the card computes said XMAC with a mechanism involving the data to be checked along with the authentication key K. Then, an attacker can force the utilization of the authentication key by sending to the card an authentication request with strategically chosen data. By various methods, such as side-channel and perturbation attacks, information is revealed, leading to the partial or total disclosure of the authentication key.

To be exploitable, most attacks require a given amount of authentication requests depending on the strength of the algorithm used to compute the XMAC. For each of these trials, the attacker must provide a dummy MAC (since it does not know the actual value of the key).

In known systems such as the one disclosed in the above-quoted document EP-A-1 156 694, in case of suspected tamper detection, namely whenever MAC and XMAC do not match, it is suggested to send back to the requesting entity a message asking for re-transmitting the message, then check again whether the message received anew is proper or not, and terminate the procedure in the negative. However, the system disclosed in this document does not provide any mean for keeping track of such succession of events, so that nothing may prevent the attacker, after a given authentication procedure is aborted, to reiterate another same procedure, or a series of further same procedures, until he may swindle the system to get access to protected data.

SUMMARY OF THE INVENTION

The aim of the invention is to limit the number of consecutive attacks on a USIM card, specifically by limiting the number of reiterated authentication attempts performed thereon.

The invention sets forth a method such as disclosed in the above-quoted EP-A-1 156 694, namely an authentication method for use in a system including a first entity and a second entity mutually communicating by way of a network, wherein said first entity is adapted to authenticate said second entity and data received from said second entity, and wherein both first and second entities store the same secret key, said method comprising the steps of:

receiving by said first entity a message authenticating code and other parameters, said message authenticating code being a function of said secret key and said other parameters;

computing by said first entity an expected code from said other parameters which have been received and from said secret key stored in said first entity;

comparing by said first entity said message authenticating code received and said expected code; and aborting authentication if the message authenticating code received and the expected code do not match.

According to the present invention, there is provided a further step of:

updating in said first entity a failure counter every time the message authenticating code received and the expected code do not match upon comparison by said first entity.

In other words, the invention consists in providing—within the USIM card—a failure counter updated depending on the result of the comparison between MAC and XMAC in order to restrict the number of successive erroneous trials to a maximum amount, above which the key K is considered as not safe.

In this way, the number of malicious successive attacks is controlled.

According to preferred implementations, the method of the invention may include further steps of:
preliminary checking the failure counter by said first entity before initiating authentication,
determining by said first entity, from a sequence number included in said other parameters, whether said message authenticating code and other parameters have been already received by said first entity; and if said sequence number indicates that said message authenticating code and other parameters have already been received by said first entity, aborting authentication without updating said a failure counter,
resetting said failure counter to its initial value if (i) the message authenticating code received and the expected code do match and (ii) said sequence number indicates that said message authenticating code and other parameters have not already been received by said first entity.

The present invention also encompasses a smart card adapted to authenticate a remote entity and data received from it, said smart card including:
a memory storing authentication algorithms as well as authentication and encryption keys including a secret key which is the same as a corresponding key stored in said remote entity;
means for receiving from said remote entity a message authenticating code and other parameters;
means for computing an expected code from said other parameters and from said secret key;
means for comparing said message authenticating code received and said expected code; and
means for aborting authentication if the message authenticating code received and the expected code do not match.

According to the invention, said smart card further comprises:
a failure counter adapted to store the number of abortion occurrences; and
means for updating said failure counter every time the comparing means indicate that said message authenticating code and said expected code do not match.

So, thanks to its built-in failure counter and the fact that the updating of this counter is controlled from inside the card, the card becomes a tamper-resistant, more secure device.

BRIEF DESCRIPTION OF THE DRAWINGS

The foregoing and other objects, aspects and advantages of the invention will be better understood from the following detailed description of a preferred embodiment of the invention with reference to the appended drawings.

DETAILED DESCRIPTION OF A PREFERRED EMBODIMENT OF THE INVENTION

Figure 1:
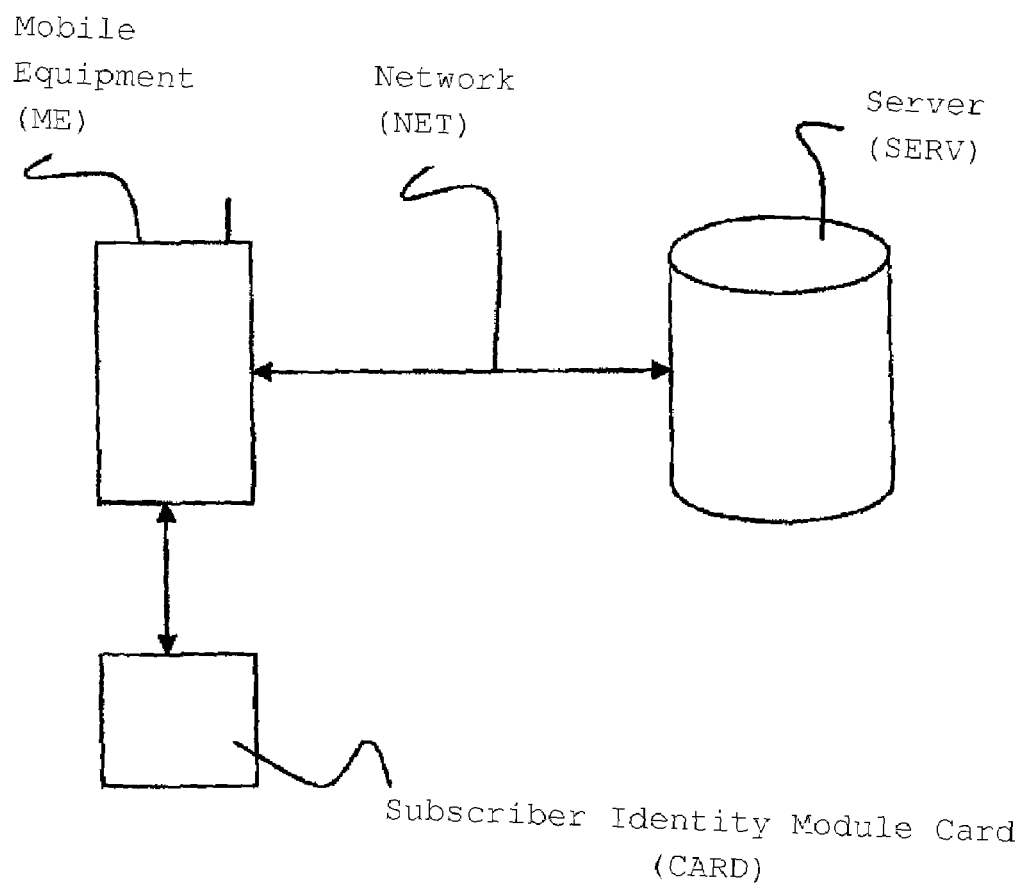
FIG. 1 illustrates an example of a data processing system to which the invention may be applied.

FIG. 1 illustrates a system including a user equipment communicating with a server SERV by way of a network NET such as Internet or private network. The user equipment consists in two parts: the Mobile Equipment ME and the Subscriber Identity Module CARD. The mobile equipment ME is the radio terminal used for radio communication between the user equipment and the server SERV. In this example, the card CARD is a USIM smart card that holds the subscriber identity, performs authentication algorithms, and stores authentication and encryption keys and subscription information that is needed at the terminal.

The server SERV is adapted to provide a service to a mobile station after a successful authentication of the mobile station.

According to the invention, a counter in the card controls the number of authentication procedures aborted by the card. Preferably, the counter counts successively aborted authentication procedures.

Figure 2:
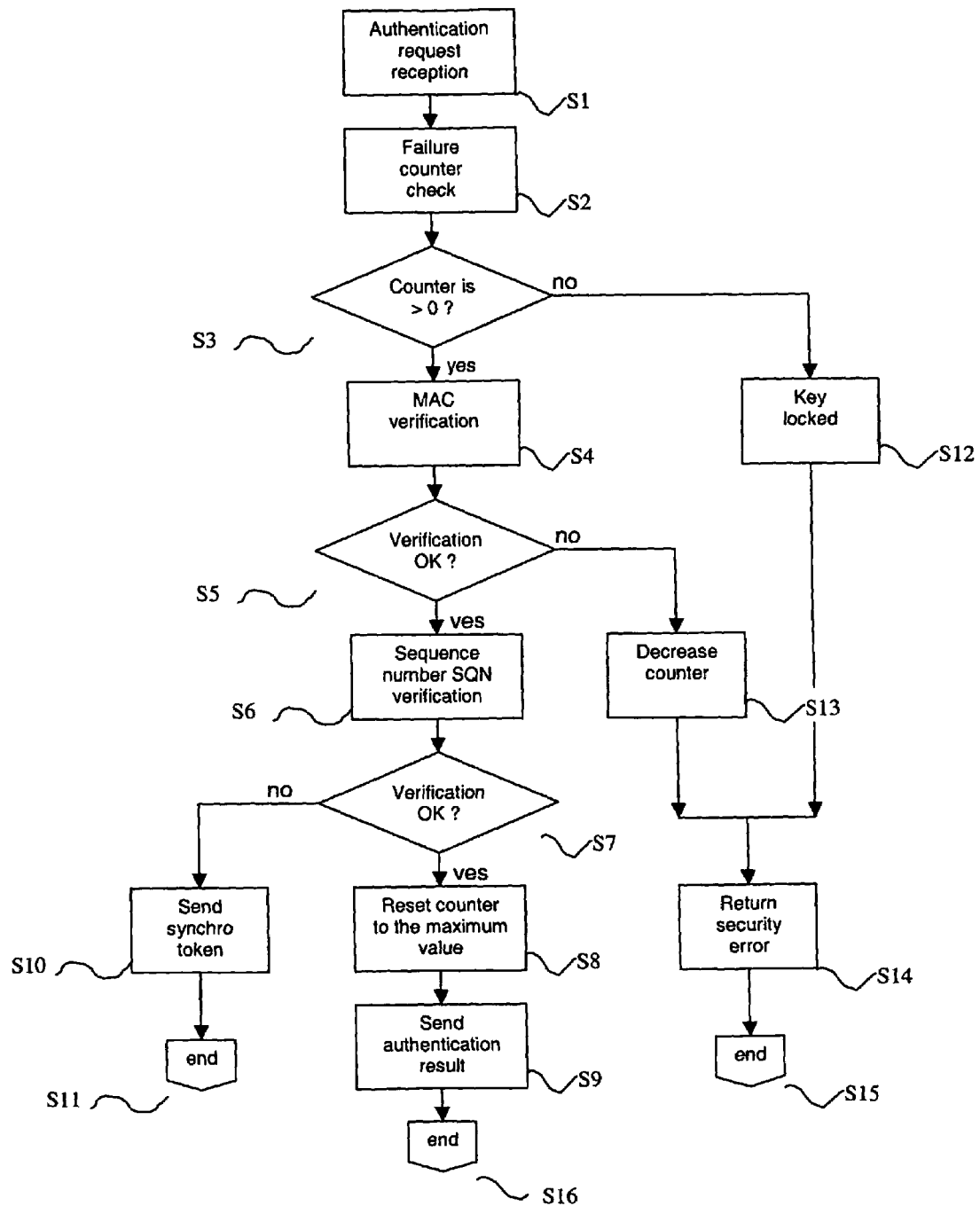
FIG. 2 is an example of an authentication failure counter management algorithm.

FIG. 2 is an authentication algorithm illustrating the invention, which includes several steps S1-S16.

In a first step (S1), the card receives an authentication request.

In a second step (S2), before checking the MAC, the card checks the failure counter:
if the counter is zero (S3, S12), it considers that the key is not safe and does not proceed further. In this case, the card returns a security error message (step S14). After step S14, the authentication procedure is terminated (S15);
else (S3,S4), it can use the key and verify (S5) the data provided MAC:
if the value expected by the card does not match the one provided in the request, then the card decrements the error counter (S13) and sends a security error notification to the ME.
else it checks the SQN of the request (S6), to ensure that it is not processing a request which has already been previously sent:
if the SQN appears not to be fresh (S7,S10), then the card sends back a resynchronization token over the network (S10) as defined in the AKA. After S10, the procedure is terminated (S11);
else, if the SQN appears to be valid (S7,S8), then, in this example, the card resets the error counter to its maximal value(S8). After, the card can send a positive authentication result (S9). Step S16 is the end of the authentication procedure.

Once the error counter reaches zero, then the authentication key can no longer be used. Thus, it allows only a small amount of consecutive errors. The above-mentioned attacks require trials leading to MAC verification errors. Since the counter limits the number of trials, the attack may be countered.

For example, let us suppose that the maximal value of the counter is 3 and assume the initial value of the counter is 1. The six following consecutive authentications illustrate several possible scenarios.

$1^{st}$ Authentication: Counter >0, Correct MAC, valid SQN
Initial value of the counter: 1
Reception of the authentication request (S1)
As the counter is strictly positive (S3), a MAC verification is performed (S4).
As the MAC is correct (S5), a SQN verification is performed (S6)

As the SQN is valid (S7), the counter is reset to its maximal value, i.e. 3 (S8).
The authentication result is returned (S9)
Final value of the counter: 3

$2^{nd}$ Authentication: Counter >0, incorrect MAC
Initial value of the counter: 3
Reception of the authentication request (S1)
As the counter is strictly positive (S3), a MAC verification is performed (S4).
As the MAC is incorrect (S5), the counter is decremented. The new value of the counter is 2 (S13)
A security error is returned (S14)
Final value of the counter: 2

$3^{rd}$ Authentication: Counter >0, correct MAC, invalid SQN
Initial value of the counter: 2
Reception of the authentication request (S1)
As the counter is strictly positive (S3), a MAC verification is performed (S4).
As the MAC is correct (S5), a SQN verification is performed (S6)
As the SQN is invalid (S7), a resynchronization token is sent. The counter is not modified. Its remains equal to 2.
Final value of the counter: 2

$4^{th}$ Authentication: Counter >0, incorrect MAC
Initial value of the counter: 2
Reception of the authentication request (S1)
As the counter is strictly positive (S3), a MAC verification is performed (S4).
As the MAC is incorrect (S5), the counter is decremented. The new value of the counter is 1 (S13)
A security error is returned (S14)
Final value of the counter: 1

$5^{th}$ Authentication: Counter >0, incorrect MAC
Initial value of the counter: 1
Reception of the authentication request (S1)
As the counter is strictly positive (S3), a MAC verification is performed (S4).
As the MAC is incorrect (S5), the counter is decremented. The new value of the counter is 0 (S13)
A security error is returned (S14)
Final value of the counter: 0

$6^{th}$ Authentication: Counter=0, incorrect MAC
Initial value of the counter: 0
Reception of the authentication request (S1)
As the counter is equal to 0 (S3), the key is blocked (S12)
A security error is returned (S14)
Final value of the counter: 0

The main advantages of the invention are:
the number of presentations of successive incorrect MACs is limited to the maximal value of the counter (see above authentications #2, 4, 5, 6);
the total number of authentications is not limited as the counter can be reset to its maximum value (see above authentication #1);
the reiteration of a correct authentication request does not reset the counter, as SQN is necessarily invalid, and the counter will remain unaltered (see above authentication #3);
problems associated with SQN checking do not risk to lock the card, as the counter is not decremented. (see above authentication #3)

Several variants may be contemplated:
the values of the counter are just given as an example;
the counter management may differ: the counter may be incremented instead of being decremented, it may change by increments of any value, it may be compared to any value other than 0 etc.;
the counter may count the total amount of authentication requests;
the counter may count the number of incorrect MACs without possibilities to reset it to its maximum value;
the counter may be reset as soon as the MAC is correct (i.e. without any further checks such as the SQN validity);
the counter may be decremented even if the MAC is correct and the SQN invalid.

The invention claimed is:

1. An authentication method for use in a system including a first entity and a second entity mutually communicating by way of a network, wherein said first entity is adapted to authenticate said second entity and data received from said second entity, and wherein both first and second entities store the same secret key, said authentication method comprising the steps of:
receiving by said first entity a message authenticating code and authentication function parameters, said message authenticating code being a function of said secret key and said authentication function parameters;
determining by said first entity, from a sequence number included in said authentication function parameters, whether said message authenticating code and authentication function parameters have already been received by said first entity, wherein authentication is aborted without updating a failure counter in said first entity when said sequence number indicates that said message authenticating code and authentication function parameters have already been received by said first entity;
computing by said first entity an expected code as a function of said authentication function parameters which have been received and said secret key stored in said first entity;
comparing by said first entity said message authenticating code received and said expected code;
aborting authentication when the message authenticating code received and the expected code do not match; and
updating in said first entity said failure counter every time the message authenticating code received and the expected code do not match upon comparison by said first entity.

2. The method according to claim 1, further comprising the step of:
preliminary checking the failure counter by said first entity before initiating authentication.

3. The method according to claim 1, further comprising the step of:
resetting said failure counter to its initial value if (i) the message authenticating code received and the expected code do match and (ii) said sequence number indicates that said message authenticating code and authentication function parameters have not already been received by said first entity.

4. A smart card adapted to authenticate a remote entity and data received from it, said smart card including:
memory storing authentication algorithms and a secret key which is the same as a corresponding key stored in said remote entity;
means for receiving from said remote entity a message authenticating code and authentication function parameters;
means for computing an expected code as a function of said authentication function parameters and said secret key;

means for comparing said message authenticating code received and said expected code;
means for aborting authentication and for updating a failure counter in said smart card if the message authenticating code received and the expected code do not match;
means for determining, from a sequence number included in said authentication function parameters, whether said message authenticating code and authentication function parameters have already been received by said smart card and if said sequence number indicates that said message authenticating code and other parameters have already been received by said first entity, aborting authentication without updating said failure counter.

* * * * *